United States Patent
Maenaka

(10) Patent No.: US 7,947,403 B2
(45) Date of Patent: May 24, 2011

(54) FUEL CELL SYSTEM

(75) Inventor: Takeshi Maenaka, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 254 days.

(21) Appl. No.: 12/443,856

(22) PCT Filed: Oct. 18, 2007

(86) PCT No.: PCT/JP2007/070760
§ 371 (c)(1),
(2), (4) Date: Apr. 1, 2009

(87) PCT Pub. No.: WO2008/047944
PCT Pub. Date: Apr. 24, 2008

(65) Prior Publication Data
US 2009/0280372 A1     Nov. 12, 2009

(30) Foreign Application Priority Data
Oct. 19, 2006    (JP) .................................. 2006-284721

(51) Int. Cl.
*H01M 8/04*      (2006.01)
*H01M 8/00*      (2006.01)
(52) U.S. Cl. ..................... 429/429; 429/428; 429/444
(58) Field of Classification Search .................. None
See application file for complete search history.

(56) References Cited

U.S. PATENT DOCUMENTS

2006/0040149 A1\* 2/2006 Aso et al. ........................ 429/13
2007/0231637 A1\* 10/2007 Shibata et al. .................. 429/22

FOREIGN PATENT DOCUMENTS

| JP | 2004-281219 A | 10/2004 |
| JP | 2004-311218 A | 11/2004 |
| JP | 2005-57929 A | 3/2005 |
| JP | 2005-327492 A | 11/2005 |
| JP | 2006-202683 A | 8/2006 |

\* cited by examiner

*Primary Examiner* — John S Maples
(74) *Attorney, Agent, or Firm* — Kenyon & Kenyon LLP

(57) ABSTRACT

A fuel cell system repeats first processing and second processing when the system is started. In the first processing, a control section controls an electric power distribution section so that electric power generated by a fuel cell stack is supplied to accessories and a secondary battery. In the second processing, the control section controls the electric power distribution section so that electric power generated by the fuel cell stack and electric power discharged from the secondary battery are supplied to the accessories. An electric power calculation means of the control section calculates electric power generation by the fuel cell stack and inputs an output command, representing electric power, into air compressor drive/control means. The electric power calculation means gradually changes the magnitude of electric power generation by the fuel cell stack, represented by the output command, at the time of transition between the first processing and the second processing.

6 Claims, 8 Drawing Sheets

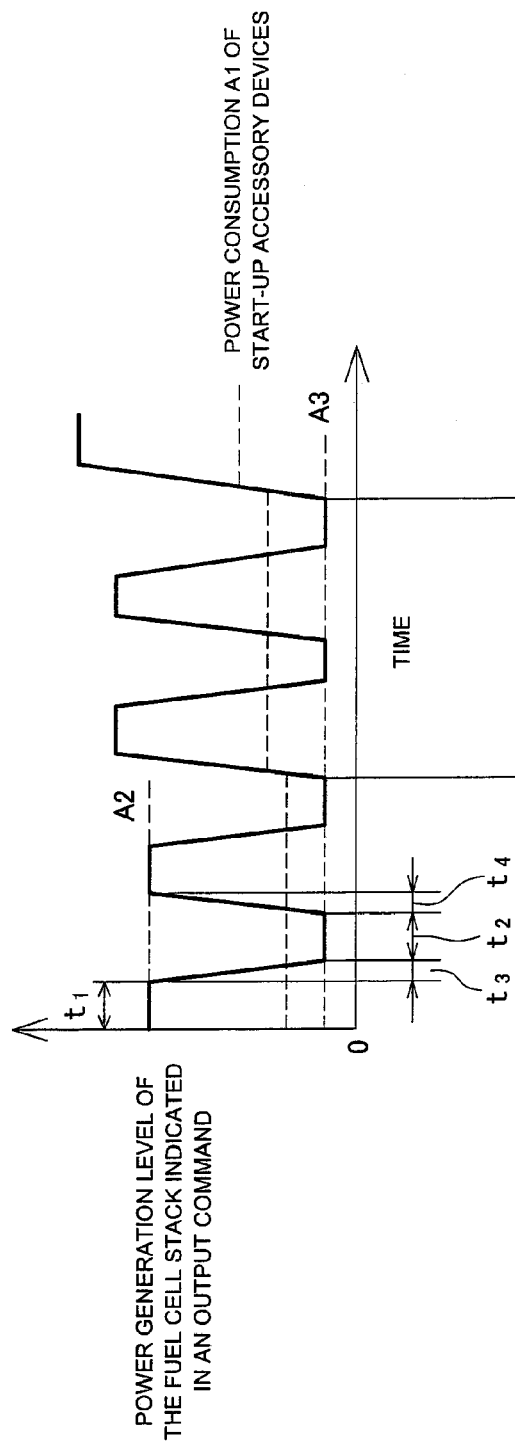
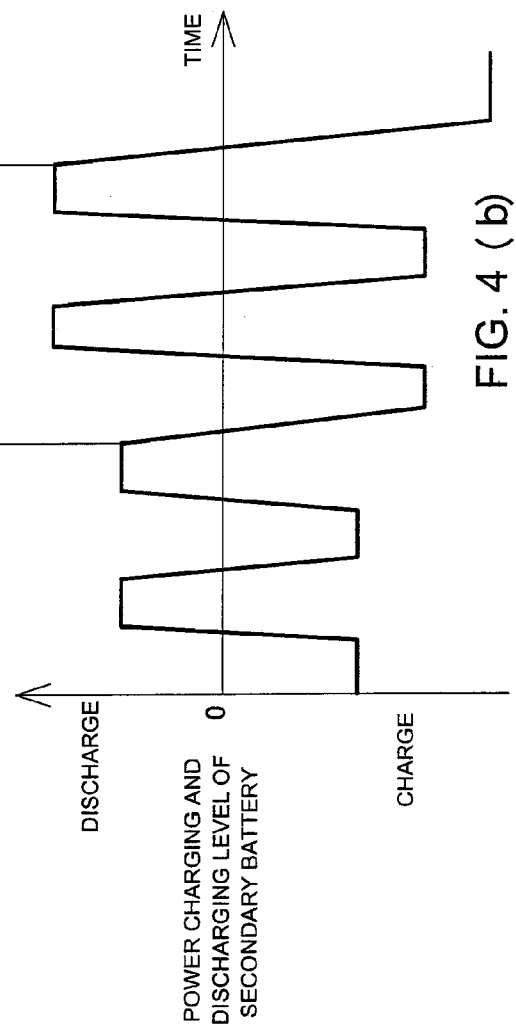

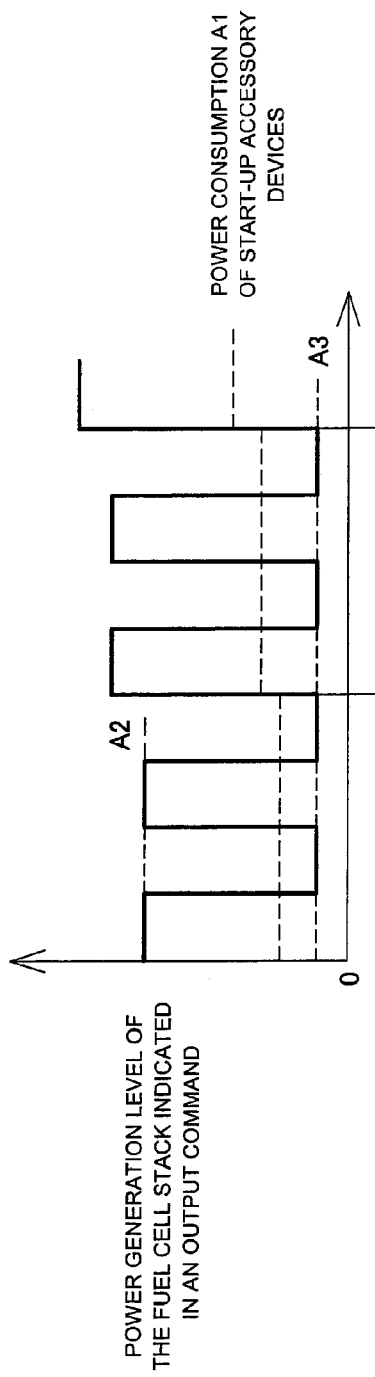
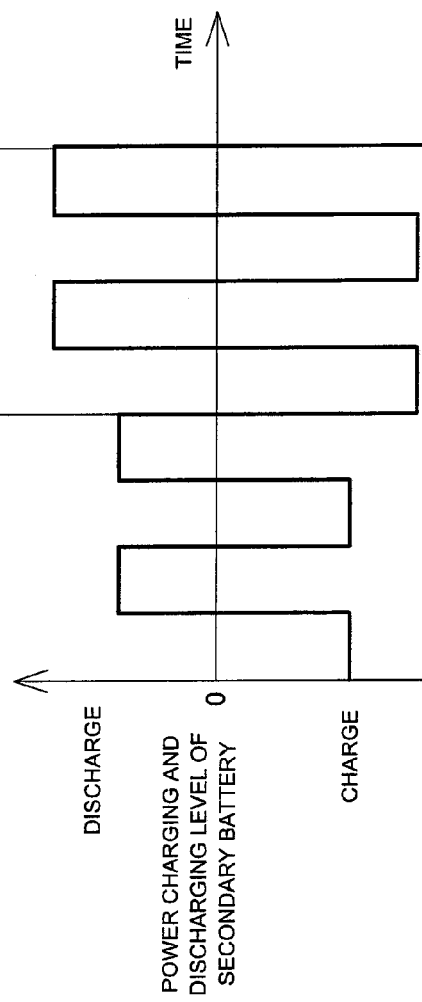

US 7,947,403 B2

FUEL CELL SYSTEM

This is a 371 national phase application of PCT/JP2007/070760 filed 18 Oct. 2007, claiming priority to Japanese Patent Application No. JP 2006-284724 filed 19 Oct. 2006, the contents of which are incorporated herein by reference.

TECHNICAL FIELD

The present invention relates to a fuel cell system including a fuel cell that generates electric power via an electrochemical reaction between a fuel gas and an oxidizing gas, as well as an oxidizing gas supply section, a secondary battery, and an electric power distribution section.

BACKGROUND ART

A fuel cell system includes a fuel cell that generates electric power via an electrochemical reaction between a fuel gas such as a gas containing hydrogen and an oxidizing gas such as air, an oxidizing gas supply section (i.e., an air compressor or the like) for supplying the oxidizing gas to the fuel cell, and a secondary battery capable of being charged and discharged. When a fuel cell system is to be started in a low-temperature environment, power-generating performance of the fuel cell and output characteristic of the secondary battery may be degraded.

In consideration of this situation, the fuel cell system described in JP 2004-281219 A is devised to include a power distribution section that supplies electric power generated by a fuel cell to accessory devices required for power generation by the fuel cell and to a secondary battery for its charging, or that supplies electric power discharged by the secondary battery to the accessory devices; and a control section that performs warm-up control processing for warming up the fuel cell and the secondary battery by alternately performing first processing and second processing at system startup. In the first processing, the power distribution section is controlled to supply generated power of the fuel cell to the accessory devices and the secondary battery, and, in the second processing, the power distribution section is controlled to supply generated power of the fuel cell and discharged power from the secondary battery to the accessory devices.

In the fuel cell system described in JP 2004-281219 A, although it may be possible to warm up the fuel cell and the secondary battery quickly by alternately performing the first processing and the second processing, the possibility that overcharge and over-discharge may occur in the secondary battery as a result cannot be denied. For example, while the drive state of an oxidizing gas supply section composed of an air compressor or the like must be controlled in order to cause the fuel cell to generate power, at the time of transition between the first processing and the second processing, there are possibilities that a change in a target value of the rotational frequency of the oxidizing gas supply section cannot be accurately followed by a change in the actual rotational frequency. The reason for this is that a time lag is generated in a change in the actual rotational frequency of the oxidizing gas supply section with respect to a command signal from the control section regarding a change of rotational frequency of the oxidizing gas supply section. In other words, the change is effected with an error. A change of rotational frequency of the oxidizing gas supply section corresponds to a change in the power generation level of the fuel cell. Accordingly, when the power generation level of the fuel cell is lowered, an undershoot may occur, resulting in an excessive decrease in the actual power generation level with respect to the target power generation value. On the other hand, when the power generation level of the fuel cell is increased, an overshoot may occur, resulting in an excessive increase in the actual power generation level with respect to the target power generation value.

When an undershoot of the power generation level of the fuel cell occurs, during an increase in power discharge from the secondary battery for compensating the decrease in power generation of the fuel cell, an over-discharge exceeding an upper threshold of power discharge tends to occur. On the other hand, when an overshoot of the power generation level of the fuel cell occurs, during an increase in power charge of the secondary battery which is charged by receiving a supply of generated power, an overcharge exceeding an upper threshold of power charge tends to occur. Such occurrences of over-discharge and overcharge of the secondary battery cause early deterioration of the secondary battery, and are therefore undesirable. Over-discharge and overcharge tend to occur particularly when the secondary battery is discharged to a level close to an upper threshold of power discharge and when the secondary battery is charged to a level close to an upper threshold of power charge.

Under a low-temperature environment, performance of the secondary battery may be degraded not only at the time of system start-up but also during continuous power generation by the fuel cell. Accordingly, in such a case, it is desirable to similarly perform the warm-up control processing to warm up the secondary battery.

An object of the present invention is to reduce possibilities of occurrence of overcharge and over-discharge of a secondary battery in a fuel cell system when the secondary battery is warmed up by alternately performing the operation of supplying generated power from a fuel cell to the secondary battery and the operation of discharging the secondary battery.

DISCLOSURE OF THE INVENTION

A fuel cell system according to the present invention includes a fuel cell that generates electric power via an electrochemical reaction between a fuel gas and an oxidizing gas; an oxidizing gas supply section for supplying the oxidizing gas to the fuel cell; a secondary battery that performs charging and discharging of electric power; an electric power distribution section that supplies electric power generated by the fuel cell to an accessory device required for power generation by the fuel cell and to the secondary battery for its charging, or supplies electric power discharged by the secondary battery to at least one of the accessory device and a load; and a control section that performs warm-up control processing for warming up the secondary battery by alternately performing first processing and second processing, the first processing for controlling the electric power distribution section to supply generated power of the fuel cell to the accessory device and the secondary battery, and the second processing for controlling the electric power distribution section to supply at least discharged power from the secondary battery to at least one of the accessory device and the load. The control section includes a power generation calculation unit that calculates, when performing the warm-up control processing, a power generation level of the fuel cell based on a chargeable/dischargeable power level of the secondary battery; and a drive control unit for the oxidizing gas supply section, that controls a drive state of the oxidizing gas supply section based on the calculated value of power generation level of the fuel cell indicated in an output command from the power generation calculation unit. The power generation calculation unit gradually changes the magnitude of the power generation level of the fuel cell at a time of transition between the first processing and the second processing, the power generation level being indicated in the output command input into the drive control unit for the oxidizing gas supply section.

Preferably, the oxidizing gas supply section is an air compressor, and the drive control unit for the oxidizing gas supply section controls a rotational frequency of the air compressor based on the calculated value of power generation level of the fuel cell indicated in the output command from the power generation calculation unit.

In a fuel cell system according to the present invention, the power generation calculation unit gradually changes the magnitude of the power generation level of the fuel cell at a time of transition between the first processing and the second processing, the power generation level at the time of transition being indicated in the output command input into the drive control unit for the oxidizing gas supply section. Accordingly, at a time of transition between the first processing and the second processing, a change in a target value of the drive state of the oxidizing gas supply section can be accurately followed by a change in the actual drive state. Therefore, it is possible to reduce the likelihood of occurrence of an excessive decrease of the power generation level with respect to a target value when the power generation level of the fuel cell is decreased, and to reduce the likelihood of occurrence of an excessive increase of the power generation level with respect to a target value when the power generation level of the fuel cell is increased. As a result, possibilities of occurrence of over-discharge and overcharge of the secondary battery can be reduced even when the secondary battery is discharged at a level close to an upper threshold of power discharge and when the secondary battery is charged at a level close to an upper threshold of power charge.

BRIEF DESCRIPTION OF THE DRAWINGS

FIG. 4 shows states during execution of the warm-up control processing shown in FIG. 3. FIG. 4(a) is a diagram showing a change over time of a calculated value of power taken out from a fuel cell stack indicated in an output command from the power generation calculation unit. FIG. 4(b) is a diagram showing a change over time of power charging and discharging level of the secondary battery.

FIG. 5 shows states during execution of warm-up control processing in a conventional fuel cell system. FIG. 5(a) is a diagram showing a change over time of a calculated value of power taken out from a fuel cell stack indicated in an output command from a power generation calculation unit. FIG. 5(b) is a diagram showing a change over time of power charging and discharging level of the secondary battery.

DESCRIPTION OF EXEMPLARY EMBODIMENTS

First Embodiment of the Invention

Figure 1:
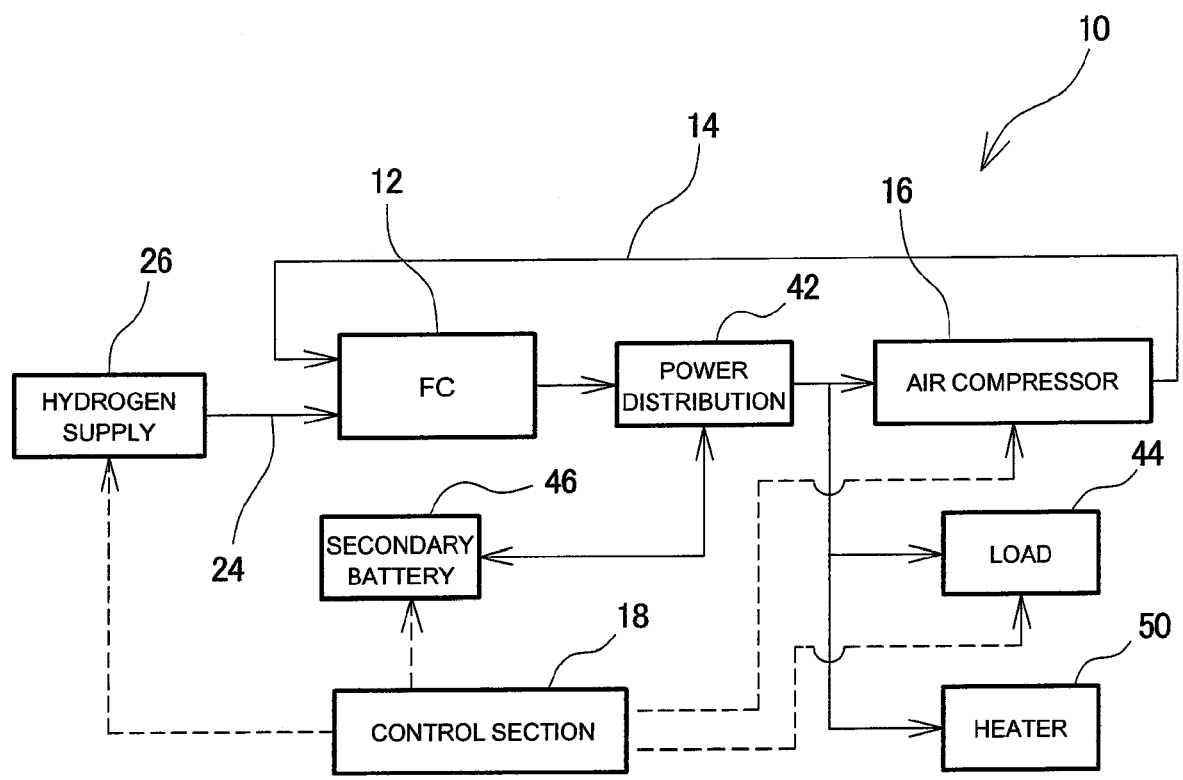
FIG. 1 is a block diagram showing a basic configuration of a fuel cell system according to an embodiment of the present invention.
Figure 2:
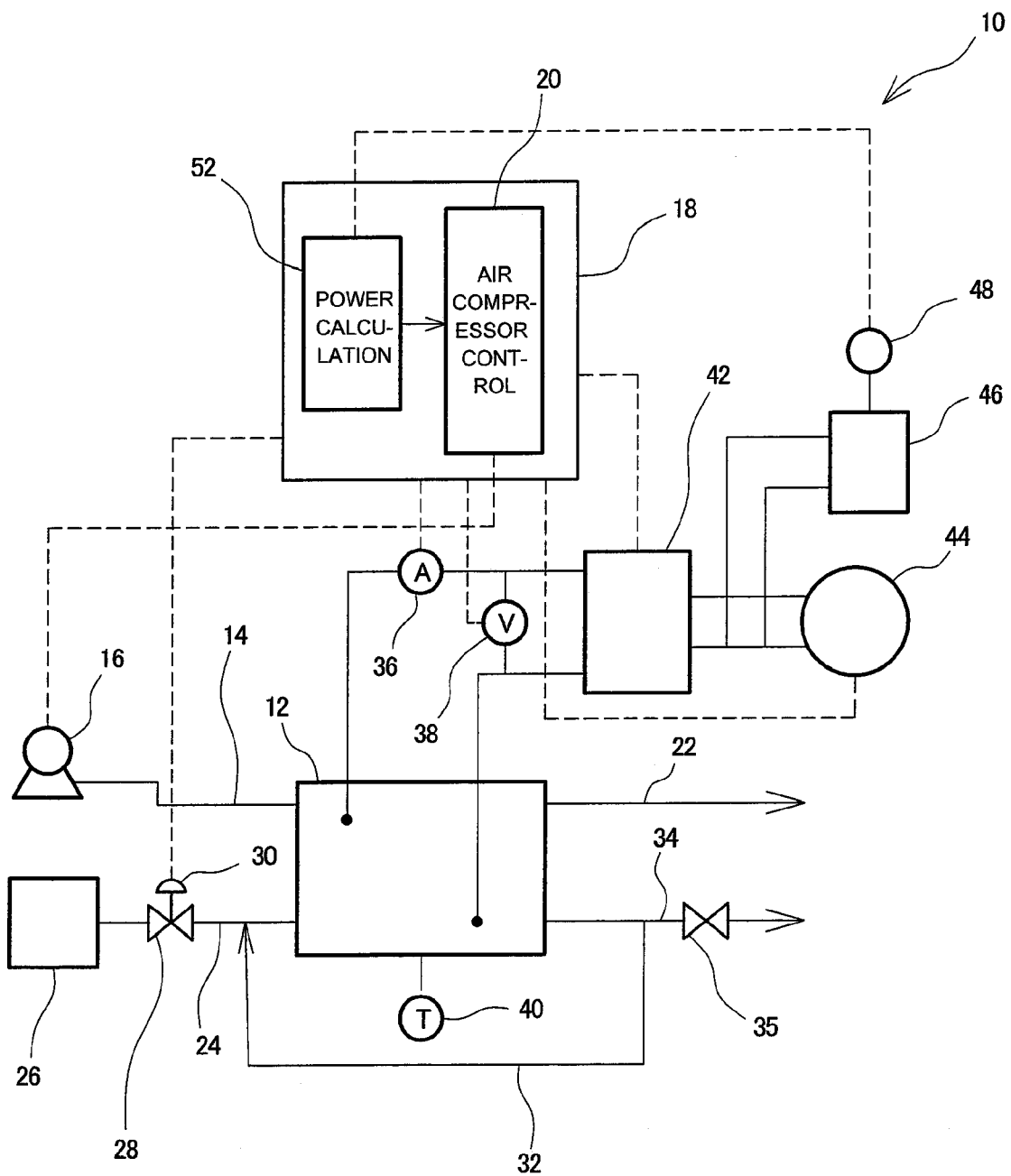
FIG. 2 is a configuration diagram showing the configuration of the embodiment of the present invention in further detail.

Embodiments related to the present invention are explained in detail below with reference to the drawings. FIGS. 1-4 and 7 show a first embodiment of the present invention. FIG. 1 is a block diagram showing a basic configuration of a fuel cell system 10 according to the present embodiment, and FIG. 2 is a configuration diagram showing a detailed configuration of the same embodiment.

The fuel cell system 10 according to the present embodiment is for use by being mounted on a fuel cell vehicle, and includes a fuel cell stack 12. This fuel cell stack 12 includes a fuel cell lamination structure formed by laminating a plurality of fuel cells, and further includes a current collector plate and an endplate provided at each of the two end portions of the fuel cell lamination structure located along the lamination direction. The fuel cell lamination structure, current collector plates, and endplates are clamped together by use of components such as tie rods and nuts. An insulator plate may be provided between the current collector plate and the endplate.

Although a detailed view of each fuel cell is not given herein, each fuel cell may include a membrane assembly formed by holding an electrolyte membrane between an anode electrode and a cathode electrode, and separators provided on both sides of the assembly. Hydrogen gas serving as the fuel gas can be supplied to the anode electrode, while air serving as the oxidizing gas can be supplied to the cathode electrode. Hydrogen ions generated at the anode electrode are moved through the electrolyte membrane to the cathode electrode, and subjected to electrochemical reaction with oxygen at the cathode electrode, thereby generating water. Further, electrons are moved from the anode electrode to the cathode electrode via an external circuit, thereby generating electromotive force.

Inside the fuel cell stack 12, an internal coolant path (not shown) is provided near the separators. By allowing cooling water (i.e., a coolant) to flow in this internal coolant path, even when the temperature is increased due to heat generation accompanying power generation by the fuel cell stack 12, excessive temperature increase is prevented.

In order to supply air (i.e., the oxidizing gas) to the fuel cell stack 12, an oxidizing gas supply channel 14 is provided, and in addition, an air compressor 16 serving as the oxidizing gas supply section is provided at the upstream of gas of the oxidizing gas supply channel 14. Air introduced from outside air into the air compressor 16 is pressurized by the air compressor 16 and subsequently humidified by means of a humidifier (not shown). The air compressor 16 is driven by a drive motor (not shown). The rotational frequency of the drive motor is controlled by an air compressor drive control unit 20 (FIG. 2) provided in a control section 18 implemented as an electronic control unit (ECU) or the like. The humidified air is supplied to a channel located on the cathode electrode side within the fuel cell stack 12.

Air off-gas released after the air is supplied to the fuel cell stack 12 and subjected to the electrochemical reaction in each fuel cell is discharged from the fuel cell stack 12 through an oxidizing-gas-related discharge gas channel 22. At some intermediate point in the oxidizing-gas-related discharge gas channel 22, a pressure adjustment valve (not shown) is provided, and is controlled such that the supply pressure of the air delivered to the fuel cell stack 12 conforms to an appropriate pressure value in accordance with the operating state of the fuel cell stack 12. To enable this control, a pressure detection value detected at the pressure adjustment valve is input into the control section 18.

Further, in order to supply hydrogen gas (i.e., the fuel gas) to the fuel cell stack 12, a fuel gas supply channel 24 is provided. In addition, upstream of gas of the fuel gas supply channel 24, there is provided a hydrogen gas supply apparatus 26 serving as the fuel gas supply apparatus, which includes devices such as a high-pressure hydrogen tank and a reforming device for generating hydrogen via reforming reaction. Hydrogen gas delivered from the hydrogen gas supply apparatus 26 to the fuel gas supply channel 24 is supplied, via a pressure-reducing valve 28 (i.e., a pressure adjustment valve), to a channel located on the anode electrode side within the fuel cell stack 12. The degree of opening of the pressure-reducing valve 28 is adjusted by controlling an actuator 30 via the control section 18.

Hydrogen-related discharge gas released after the hydrogen gas is supplied to the channel on the anode electrode side in the fuel cell stack 12 and subjected to the electrochemical reaction is discharged from the fuel cell stack 12 and recirculated via a fuel gas circulation path 32 back to the fuel cell stack 12. The fuel gas circulation path 32 includes a hydrogen gas circulation pump (not shown). Hydrogen-related discharge gas is subjected to pressure increase using the hydrogen gas circulation pump, subsequently combined with hydrogen gas introduced from the hydrogen gas supply apparatus 26, and then again introduced into the fuel cell stack 12.

A gas-liquid separator (not shown) is provided within the fuel gas circulation path 32, and an upstream end of a fuel-gas-related discharge path 34 is connected to the gas-liquid separator. In other words, the fuel-gas-related discharge path 34 is branched off from the fuel gas circulation path 32. A part of the hydrogen-related discharge gas delivered to the gas-liquid separator is introduced, together with moisture separated in the gas-liquid separator, into a diluter (not shown) through the fuel-gas-related discharge path 34 including a purge valve 35, combined with the air off-gas delivered through the oxidizing-gas-related discharge gas channel 22, and exhausted after the hydrogen concentration is lowered.

At some intermediate point in the fuel gas circulation path 32, the fuel-gas-related discharge path 34 may be branched off at a point other than the gas-liquid separator, such as at a point between the fuel cell stack 12 and the gas-liquid separator, and hydrogen-related discharge gas delivered through this fuel-gas-related discharge path 34 may introduced into the diluter.

For state detection of the fuel cell stack 12, there are provided a current sensor 36 for detecting the output current of the fuel cell stack 12, a voltage sensor 38 for detecting the output voltage of the fuel cell stack 12, and a temperature sensor 40 for detecting the temperature of the fuel cell stack 12. When power is generated in the fuel cell stack 12, detection signals from the respective sensors 36, 38, 40 are read by the control section 18. Based on these detection signals, the control section 18 controls the rotational frequency of the rotational axis (i.e., the drive state) of the air compressor 16, the pressure adjustment valve provided at an intermediate point of the oxidizing-gas-related discharge gas channel 22, the pressure-reducing valve 28, and the like which serve as the accessory devices, so as to attain hydrogen pressure and flow rate and air pressure and flow rate in accordance with a target power generation level.

Power generated in the fuel cell stack 12 is supplied to a power distribution section 42. The power distribution section 42 is controlled by the control section 18 to supply the generated power of the fuel cell stack 12 to a load 44 and the accessory devices for their consumption, and to cause a secondary battery 46 that performs power charging and discharging to discharge power as necessary and to supply this discharged power to the load 44 and the accessory devices for their consumption. Further, the power distribution section 42 is controlled by the control section 18 to supply the generated power of the fuel cell stack 12 to the secondary battery 46 for its charging. State of charge (SOC) and temperature of the secondary battery 46 are detected by means of a secondary battery sensor 48.

The load 44 shown in FIGS. 1 and 2 is a travel motor used for vehicle travel. Further, an actual load in the fuel cell system 10 includes a heater 50 (FIG. 1) that can heat the fuel cell stack 12 and the secondary battery 46. Accessory devices include, in addition to the air compressor 16, devices necessary for causing the fuel cell stack 12 to generate power, such as a cooling water pump for circulating the cooling water in a cooling water path for cooling the fuel cell stack 12, a radiator cooling fan provided in the cooling water path, an inverter provided in the power distribution section 42, and the control section 18.

The control section 18 executes a control program stored in a memory (not shown) in order to control the power generation state of the fuel cell stack 12. Further, the control section 18 controls the power distribution section 42 so as to control power supplied to the load 44 and the accessory devices. The control section 18 also executes the warm-up control processing at the time of start-up of the fuel cell system 10. In the warm-up control processing, the control section 18 executes a control program such that the fuel cell stack 12 generates power to heat itself, and the secondary battery 46 repeats charging and discharging operations a plurality of times to heat itself, thereby warming up the fuel cell stack 12 and the secondary battery 46. As a result of this processing, stable power can be supplied from the fuel cell stack 12 and the secondary battery 46 to the load 44.

More specifically, in the warm-up control processing, at the time of start-up of the fuel cell system 10, the fuel cell stack 12 and the secondary battery 46 are warmed up by alternately performing, in the control section 18, first processing that controls the power distribution section 42 to supply generated power of the fuel cell stack 12 to the accessory devices and the secondary battery 46, and second processing that controls the power distribution section 42 to supply generated power of the fuel cell stack 12 and discharged power from the secondary battery 46 to the accessory devices. In order to perform this warm-up control processing, the control section 18 includes a power generation calculation unit 52 that calculates a power generation level of the fuel cell stack 12 based on a chargeable power level and a dischargeable power level (i.e., chargeable/dischargeable power level) of the secondary battery 46, and the air compressor drive control unit 20 that controls the drive state of the air compressor based on the calculated value of power generation level of the fuel cell indicated in an output command from the power generation calculation unit 52. The above-noted warm-up control processing is explained in further detail below by reference to FIG. 3.

Figure 3:
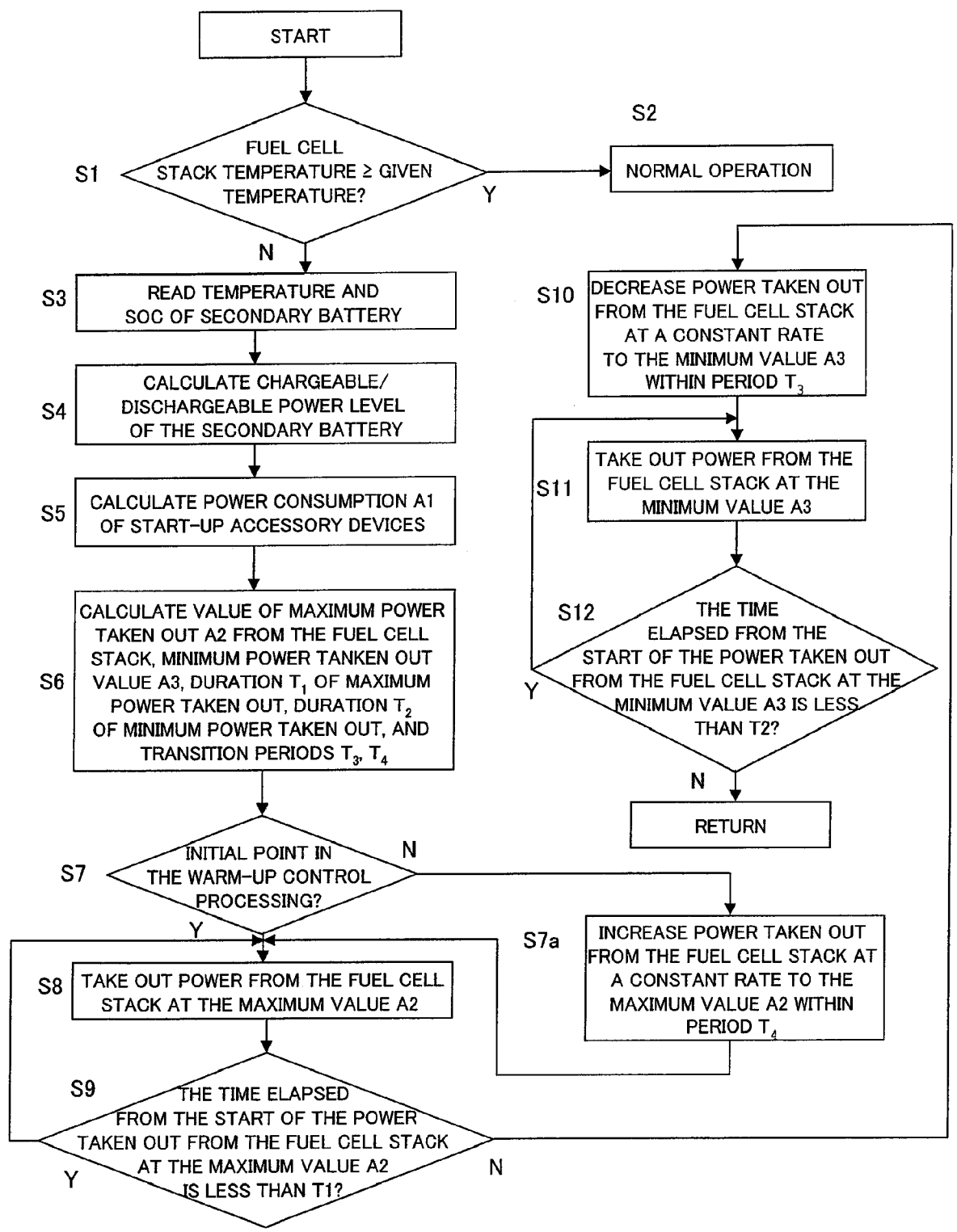
FIG. 3 is a flowchart showing warm-up control processing performed in the fuel cell system according to the embodiment of the present invention.

FIG. 3 is a flowchart showing the warm-up control processing for warming up the fuel cell stack 12 and the secondary battery 46 at the time of start-up of the fuel cell system 10 by causing the fuel cell stack 12 to generate power and by repeating charging and discharging of the secondary battery 46. First, at the time of start-up of the fuel cell system 10, in step S1, a judgment is made every elapse of a given time interval as to whether or not the temperature of the fuel cell stack 12 is equal to or higher than a given temperature. In other words, in step S1, the control section 18 (FIGS. 1 and 2) reads a detection signal from the temperature sensor 40 (FIG. 2) to determine the temperature of the fuel cell stack 12, and judges whether or not the temperature of the fuel cell stack 12 is equal to or higher than the predetermined given temperature. Further, in step S1, in a case where sufficient time has elapsed from a stop of power generation in the fuel cell stack 12, the control section 18 may read, instead of the detection signal from the temperature sensor 40, a detection signal from an outside temperature sensor (not shown) to determine the outside temperature, and judge whether or not the outside temperature is equal to or higher than a predetermined given temperature. Alternatively, it is also possible to judge whether or not the temperature of the fuel cell stack 12 is equal to or higher than a given temperature by detecting the temperature of the cooling water for cooling the fuel cell stack 12.

When it is judged in step S1 of FIG. 3 that the temperature of the fuel cell stack 12 or the outside temperature is equal to or higher than a given temperature, warming up the fuel cell stack 12 and the secondary battery 46 is unnecessary. Accordingly, in that case, a shift is made to the normal operation mode in step S2, and the warm-up control processing is ended. On the other hand, when it is judged that the temperature of the fuel cell stack 12 or the outside temperature is lower than the given temperature, the processing proceeds to step S3.

In step S3, the control section 18 reads detection signals from the secondary battery sensor 48 (FIG. 2) to detect the temperature and SOC (i.e., the state) of the secondary battery 46. Subsequently, in step S4 of FIG. 3, the power generation calculation unit 52 (FIG. 2) of the control section 18 calculates the chargeable power level and the dischargeable power level (i.e., the chargeable/dischargeable power level) of the secondary battery 46 based on the detected temperature and SOC values of the secondary battery 46. The detected temperature and SOC values of the secondary battery 46 are used because the chargeable/dischargeable power level of the secondary battery 46 is influenced by the temperature and the SOC.

Subsequently, in step S5 of FIG. 3, the power generation calculation unit 52 (FIG. 2) calculates power consumption A1 of start-up accessory devices (refer to FIG. 4). Power consumption A1 of start-up accessory devices is the power consumption by the accessory devices required for causing the fuel cell stack 12 to generate power having a level that corresponds to the chargeable power level of the secondary battery 46 obtained in step S4. For example, power consumption A1 of start-up accessory devices is calculated using data of a map showing the relationship between power level corresponding to the chargeable power level and power consumption by the accessory devices.

Next, in step S6 of FIG. 3, the power generation calculation unit 52 calculates, based on the power consumption A1 of start-up accessory devices calculated in step S5 and the chargeable power level of the secondary battery 46 calculated in step S4, a value of maximum power taken out A2 from the fuel cell stack 12 (refer to FIG. 4), duration $t_1$ of continuous taking out at the maximum power taken out value A2 (refer to FIG. 4), a value of minimum power taken out A3 from the fuel cell stack 12 which is no greater than the power consumption A1 of start-up accessory devices (refer to FIG. 4), and duration $t_2$ of continuous taking out at the minimum power taken out value A3 (refer to FIG. 4). Specifically, a sum of the power consumption A1 of start-up accessory devices calculated in step S5 of FIG. 3 and the chargeable power level of the secondary battery 46 calculated in step S4 equals the value of maximum power taken out A2 from the fuel cell stack 12.

In particular, the power generation calculation unit 52 (FIG. 2) calculates, as shown in FIG. 4(a), transition period $t_3$ which is a period after taking out of power from the fuel cell stack 12 at the maximum value A2 for duration $t_1$ and before start of taking out of power from the fuel cell stack 12 at the minimum value A3, and transition period $t_4$ which is the period after taking out of power from the fuel cell stack 12 at the minimum value A3 for duration $t_2$ and before start of taking out of power from the fuel cell stack 12 at the maximum value A2. As shown in FIG. 4(a), the power generation calculation unit 52 outputs a command for, subsequent to power taken out from the fuel cell stack 12 at the maximum value A2, gradually reducing, at a constant rate, the power taking out level to the minimum value A3 within transition period $t_3$. Further, the power generation calculation unit 52 outputs a command for, subsequent to power retrieval from the fuel cell stack 12 at the minimum value A3, gradually increasing, at a constant rate, the power retrieval level to the maximum value A2 within transition period $t_4$. Output commands indicating the values A2, A3 of power taken out from the fuel cell stack 12, durations $t_1$, $t_2$, and transition periods $t_3$, $t_4$ calculated in the power generation calculation unit 52 are input into the air compressor drive control unit 20 (FIG. 2) of the control section 18.

In accordance with the output commands, the air compressor drive control unit 20 first calculates the rotational frequency of the air compressor 16 necessary for attaining the maximum power taken out value A2, and controls the air compressor 16 to rotate at the calculated rotational frequency for duration $t_1$. In other words, when it is judged in step S7 of FIG. 3 that the warm-up control processing is at its initial point, the air compressor drive control unit 20 controls the rotational frequency of the air compressor 16 so that, in step S8, power is taken out from the fuel cell stack 12 at the maximum power retrieval value A2. In addition, hydrogen gas flow rate and pressure that correspond to the air flow rate and pressure attained at this rotational frequency are calculated in a pressure-reducing valve control unit of the control section 18, and the degree of opening of the pressure-reducing valve 28 (FIG. 2) is controlled accordingly to a predetermined constant degree. Further, accompanying the above operations, the first processing is performed by the control section 18 to control the power distribution section 42 to supply, from among the generated power, power corresponding to the chargeable power level of the secondary battery 46 calculated in step S4, from the fuel cell stack 12 (FIG. 1) to the secondary battery 46 so as to charge the secondary battery 46, and also to supply part of the generated power to the accessory devices.

Next, in step S9 of FIG. 3, the control section 18 judges whether or not the time during which power is taken out from the fuel cell stack 12 at the maximum value has lasted for duration $t_1$ (FIG. 4). When it is judged that this power taking out time has lasted for duration $t_1$, subsequently, in step S10 of FIG. 3, the air compressor drive control unit 20 performs control for reducing the rotational frequency of the air compressor such that power taken out from the fuel cell stack 12 decreases at a constant rate within transition period $t_3$, from the maximum value A2 to the minimum value A3, as shown in FIG. 4(a). In accordance with this operation, the pressure-reducing valve control unit performs control for reducing the degree of opening of the pressure-reducing valve 28 within transition period $t_3$. Accompanying this operation, as shown in FIG. 4(b), after the charging level of the secondary battery 46 is gradually decreased to reach zero, the discharging level of the secondary battery 46 is gradually increased, and the second processing is performed by the control section 18 to control the power distribution section 42 to supply the generated power of the fuel cell stack 12 and discharged power from the secondary battery 46 to the accessory devices such as the air compressor.

Next, in step S11 of FIG. 3, the air compressor drive control unit 20 controls the rotational frequency of the air compressor 16 such that power is taken out from the fuel cell stack 12 at the minimum power taken out value A3. In addition, the pressure-reducing valve control unit in the control section 18 controls the degree of opening of the pressure-reducing valve 28 to a predetermined constant degree corresponding to the rotational frequency of the air compressor 16. Further, accompanying this operation, the control section 18 controls the power distribution section 42 to cause the secondary battery 46 to discharge power at the dischargeable power level calculated in step S4 and to supply the discharged power to the accessory devices.

Next, in step S12 of FIG. 3, the control section 18 judges whether or not the time during which power is taken out from the fuel cell stack 12 at the minimum value A3 has lasted for duration $t_2$. When it is judged that this power taking out time has lasted for duration $t_2$, the processing returns to step S1. At that point, a judgment is made as to whether or not the temperature of the fuel cell stack 12 or the outside temperature is equal to or higher than a given temperature, and, until it is judged that the given temperature has been reached and a shift is made to the normal operation mode in step S2, the processing from step S3 to step S12 is repeated. During the repetition, because the processing has already undergone durations $t_1$, $t_2$ and transition period $t_3$, the processing proceeds from step S7 to S7a. In step S7a, the air compressor drive control unit 20 performs control for increasing the rotational frequency of the air compressor 16 such that power taken out from the fuel cell stack 12 increases at a constant rate within transition period $t_4$, from the minimum value A3 to the maximum value A2, as shown in FIG. 4(a). In accordance with this operation, the pressure-reducing valve control unit performs control for increasing the degree of opening of the pressure-reducing valve 28 within transition period $t_4$. Further, accompanying this operation, as shown in FIG. 4(b), after the discharging level of the secondary battery 46 is gradually decreased to reach zero, the control section 18 controls the power distribution section 42 so as to gradually increase the charging level of the secondary battery 46.

In the warm-up control processing as described above, by causing the fuel cell stack 12 to generate power and repeating the charging and discharging operations of the secondary battery 46, temperatures of the fuel cell stack 12 and the secondary battery 46 are gradually increased, resulting in warming up the fuel cell stack 12 and the secondary battery 46. Along with the increase of temperature of the secondary battery 46, because the chargeable power level and the dischargeable power level of the secondary battery 46 become greater as shown in FIG. 4(b), the value A2 of maximum power taken out from the fuel cell stack 12 that is indicated in an output command from the power generation calculation unit 52 becomes increased as shown in FIG. 4(a).

Figure 6:
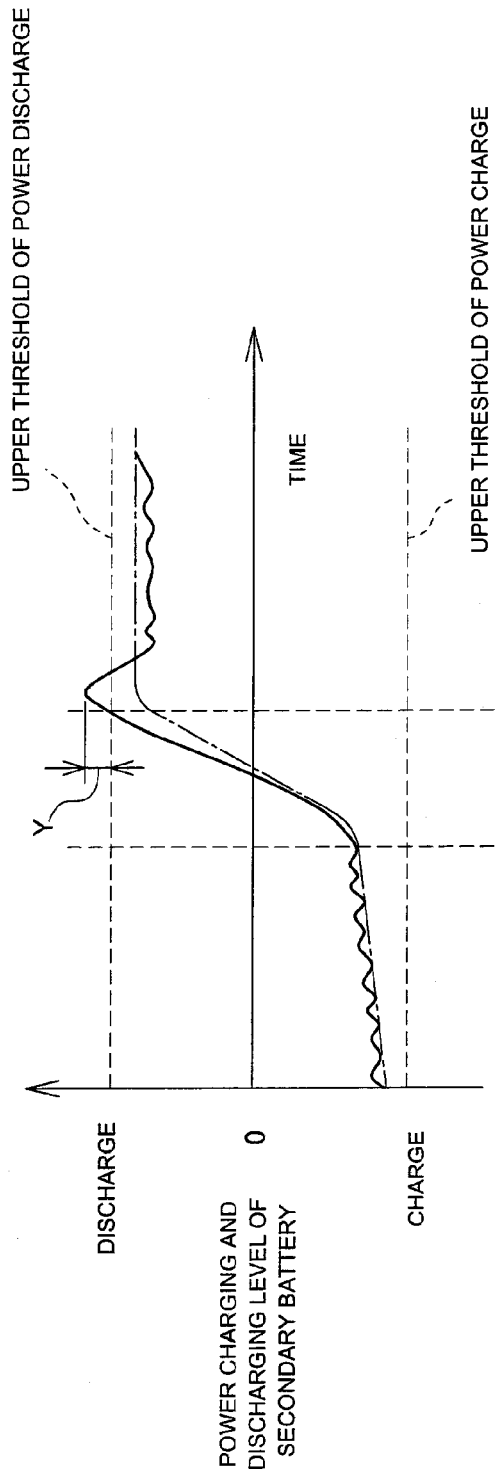
FIG. 6(a) is a diagram showing a change over time of the power charging and discharging level of a secondary battery when a state of the secondary battery is shifted from a charging state to a discharging state as shown in FIG. 5(b), the change being illustrated using a target value (in a dot-and-dash line) and an actual measured value (in a solid line).
FIG. 6(b) is a diagram showing a change over time of the rotational frequency of an air compressor, the change corresponding to FIG. 6(a) and being illustrated by reference to a target value (in a dot-and-dash line) and an actual measured value (in a solid line).
Figure 6:
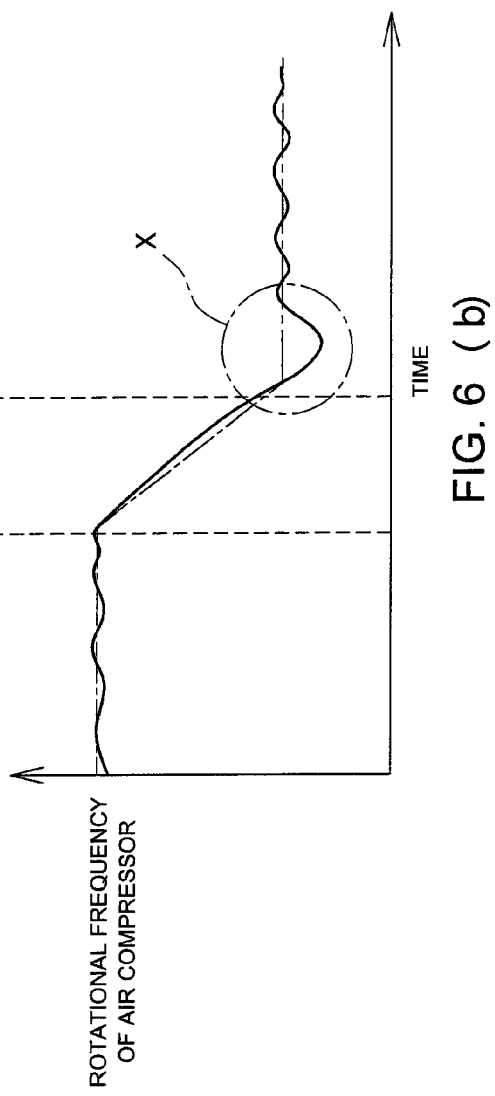

In contrast to the above-described warm-up control processing of the fuel cell system 10 according to the present embodiment, conventionally, warm-up control processing as shown in FIGS. 5 and 6 has been devised. That is, conventionally, the power generation level indicated in an output command input from the power generation calculation unit 52 (refer to FIG. 2) to the air compressor drive control unit 20 has changed been over time between the maximum value A2 and the minimum value A3 in a stepwise manner as shown in FIG. 5(a). More specifically, conventionally, in a step corresponding to step S6 of the present embodiment shown in FIG. 3, calculations of transition periods $t_3$, $t_4$ are not conducted, and steps S7, S7a, and S10 are omitted. When the power generation level of the fuel cell stack 12 (refer to FIGS. 1 and 2) indicated in the output command is changed over time in a stepwise manner, the charging and discharging power level of the secondary battery 46 is also changed over time in a substantially stepwise manner as shown in FIG. 5(b).

However, when the power generation level of the fuel cell stack 12 indicated in the output command is changed in a stepwise manner, the rotational frequency of the air compressor cannot be made to change in a manner that accurately follows the change in the output command. FIG. 6(b) shows a change over time of the rotational frequency of the air compressor 16 (refer to FIGS. 1 and 2) that occurs when the power level indicated in the output command from the power generation calculation unit 52 (refer to FIG. 2) is decreased abruptly in a stepwise manner from the maximum value A2 to the minimum value A3. In FIG. 6(b), the dot-and-dash line indicates the target rotational frequency value of the air compressor 16, while the solid line indicates the actual measured rotational frequency value of the air compressor 16. As shown in FIG. 6(b), even when the power generation level indicated in the output command is changed in a stepwise manner, a time delay occurs in the change of the rotational frequency of the air compressor 16, resulting in a gradual decrease in the rotational frequency. However, the rate of decrease in rotational frequency (i.e., the rate by which the rotational frequency decreases) is high, and an undershoot in which the actual measured rotational frequency value of the air compressor 16 (depicted in a solid line) becomes much lower than the target value (depicted in a dot-and-dash line) tends to occur, as shown at portion X in FIG. 6(b).

Meanwhile, FIG. 6(a) shows a change over time, corresponding to FIG. 6(b), of the power charging and discharging level when the state of the secondary battery 46 (refer to FIGS. 1 and 2) is shifted from a charging state to a discharging state. In FIG. 6(a), the dot-and-dash line indicates the target charging and discharging value of the secondary battery 46, while the solid line indicates the actual measured charging and discharging value of the secondary battery 46. As shown in FIG. 6(a), when the state of the secondary battery 46 is shifted from a charging state to a discharging state, accompanying the occurrence of the undershoot of the rotational frequency of the air compressor 16, there may occur an overshoot (portion Y in FIG. 6(a)) in which the actual measured discharging value of the secondary battery 46 (depicted in a solid line) becomes greatly deviated from the target value (depicted in a dot-and-dash line) and exceeds an upper threshold of discharging level. In other words, an over-discharge may occur in the secondary battery 46.

Further, although not shown in the drawings, when the rotational frequency of the air compressor 16 is to be increased from a predetermined low value to a predetermined high value, there may occur an overshoot in which the actual measured rotational frequency value of the air compressor 16 greatly exceeds the target value, and the actual measured charging value of the secondary battery 46 may become greatly deviated from the target value and exceed an upper threshold of charging level, possibly resulting in an overcharge of the secondary battery 46. Over-discharge and overcharge of the secondary battery 46 tend to occur particularly when the secondary battery is discharged to a level close to the upper threshold of discharging level and when the secondary battery is charged to a level close to an upper threshold of charging level.

In a case where the amount of change in the power generation level of the fuel cell stack 12 indicated in an output command from the power generation calculation unit 52 is small, it may be possible to reduce the likelihood of occurrence of undershoot and overshoot when the rotational frequency of the air compressor 16 is changed during execution of a warm-up control processing in a conventional fuel cell system. However, as the amount of change in the power generation level of the fuel cell stack 12 indicated in the output command becomes larger, undershoot and overshoot tend to occur when the rotational frequency of the air compressor 16 is changed during execution of warm-up control processing of a conventional fuel cell system.

The present embodiment is devised for eliminating inconveniences that occur during execution of warm-up control processing in such a conventional fuel cell system. In the present embodiment as described above, the power generation calculation unit 52 gradually changes the calculated power generation value of the fuel cell stack 12 at the time of transition between the first processing and the second processing; i.e., at the time of transition in power retrieval from the fuel cell stack 12 between the maximum power retrieval level A2 and the minimum power retrieval level A3 as shown in FIG. 4(*a*) noted above, the calculated power generation value being indicated in an output command. In other words, the magnitude of the calculated value is either gradually decreased at a constant rate or gradually increased at a constant rate. Accordingly, even at the time of reducing the rotational frequency of the air compressor 16 from a predetermined high value to a predetermined low value during a transition between the first processing and the second processing, a change in a target value of rotational frequency (i.e., drive state) of the air compressor 16 can be accurately followed by a change in the actual rotational frequency.

Figure 7:
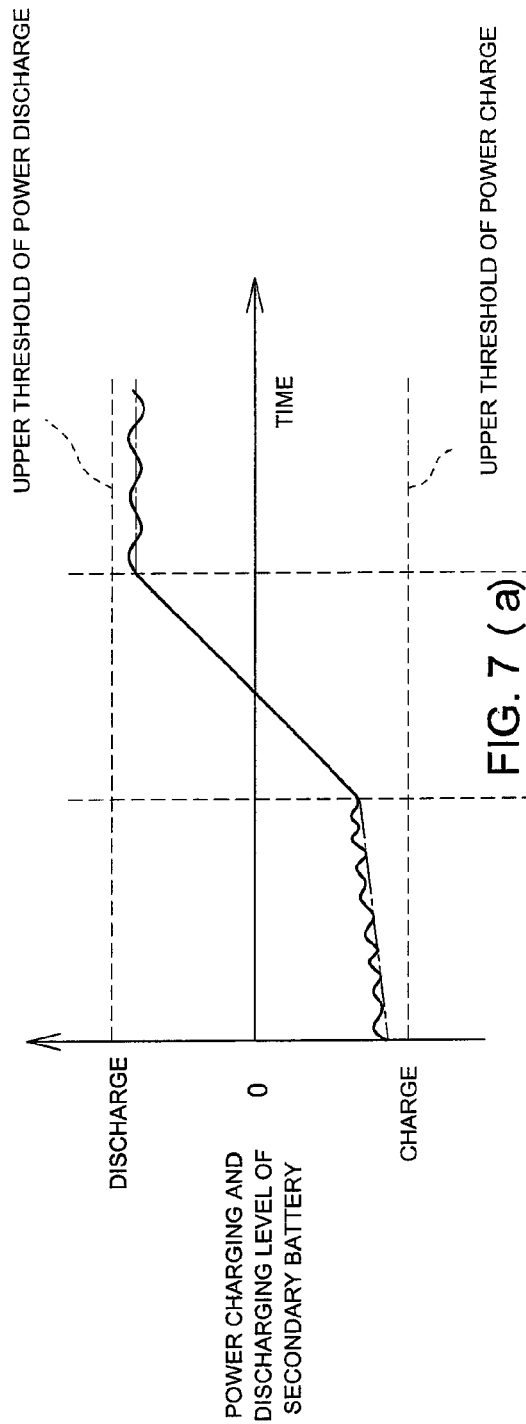
FIG. 7(a) is a diagram showing a change over time of the power charging and discharging level of a secondary battery when the state of the secondary battery is shifted from a charging state to a discharging state in the present embodiment, the change being illustrated by reference to a target value (in a dot-and-dash line) and an actual measured value (in a solid line).
FIG. 7(b) is a diagram showing a change over time of the rotational frequency of an air compressor, the change corresponding to FIG. 7(a) and being illustrated by reference to a target value (in a dot-and-dash line) and an actual measured value (in a solid line).
Figure 7:
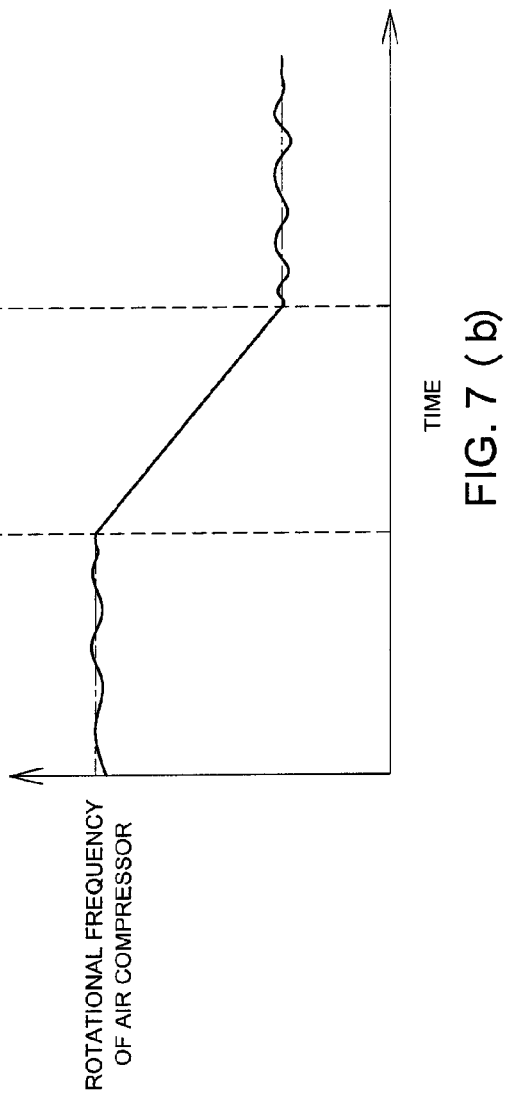

FIGS. 7(*a*) and 7(*b*) are diagrams for explaining the advantages of the present embodiment in further detail, and show a change over time of the power discharging level of the secondary battery 46 and the rotational frequency of the air compressor 16 by indicating target values and actual measured values. In FIG. 7(*a*), the dot-and-dash line indicates the target discharging and charging value of the secondary battery 46, while the solid line indicates the actual measured discharging and charging value of the secondary battery 46. In FIG. 7(*b*), the dot-and-dash line indicates the target rotational frequency value of the air compressor 16, while the solid line indicates the actual measured rotational frequency value of the air compressor 16. As is clear from a comparison between the measured results in FIGS. 7(*b*) and 6(*b*), in the case of the present embodiment shown in FIG. 7(*b*), the rate of change over time of the rotational frequency of the air compressor 16 becomes reduced. In other words, the change in the rotational frequency can be made gentle. Further, in the present embodiment shown in FIG. 7(*b*), a change in the target rotational frequency value (depicted in a dot-and-dash line) of the air compressor 16 can be accurately followed by a change in the actual rotational frequency (depicted in a solid line). Therefore, in contrast to the case shown in FIG. 6(*b*), it is possible to prevent occurrence of an undershoot in which the actual measured rotational frequency value (depicted in a solid line in FIG. 7(*b*)) of the air compressor 16 becomes much lower than the target value (depicted in a dot-and-dash line in FIG. 7(*b*)). Accordingly, it can be understood that, at the time of reducing the power generation level of the fuel cell stack 12 and causing the secondary battery 46 to discharge power, it is possible to reduce the likelihood of occurrence of an undershoot in which the actual power generation level of the fuel cell stack 12 becomes excessively lower than the target value.

As a result, as shown in FIG. 7(*a*), when the state of the secondary battery 46 is being shifted from a charging state to a discharging state, it is possible to prevent the actual discharging value (depicted in a solid line in FIG. 7(*a*)) of the secondary battery 46 from greatly deviating from the target value (depicted in a dot-and-dash line in FIG. 7(*a*)) and exceeding an upper threshold of discharging level, such that occurrence of an over-discharge in the secondary battery 46 can be prevented.

Further, although not shown in the drawings, according to the present embodiment, when the rotational frequency of the air compressor 16 is to be increased from a predetermined low value to a predetermined high value, it is also possible to prevent occurrence of an overshoot in which the actual measured rotational frequency value of the air compressor 16 greatly exceeds the target value, such that the actual measured charging value of the secondary battery 46 can be prevented from greatly deviating from the target value and exceeding an upper threshold of charging level, thereby preventing occurrence of an overcharge of the secondary battery 46. As a result, even at the time of discharging the secondary battery to a level close to the upper threshold of discharging level and at the time of charging the secondary battery to a level close to an upper threshold of charging level, possibilities of occurrence of over-discharge and overcharge of the secondary battery 46 can be reduced.

Moreover, according to the present embodiment, even when the amount of change in the power generation level of the fuel cell stack 12 indicated in an output command from the power generation calculation unit 52 is large, it is possible to reduce the likelihood of occurrence of undershoot and overshoot at the time of changing the rotational frequency of the air compressor 16. Accordingly, possibilities of occurrence of over-discharge and overcharge of the secondary battery 46 can be reduced.

In the present embodiment shown in FIG. 3 noted above, in step S5, the calculated power consumption A1 of start-up accessory devices may be employed as the basic power consumption value of start-up accessory devices, and a value obtained by adding power consumption of the accessory devices to the basic power consumption value of start-up accessory devices may be calculated as the corrected power consumption value of start-up accessory devices. Further, in step S6, a sum of the chargeable power level of the secondary battery 46 calculated in step S4 and the corrected power consumption value of start-up accessory devices calculated in step S5 can be calculated as the value of maximum power taken out A2 from the fuel cell stack 12.

When the value of maximum power taken out A2 from the fuel cell stack 12 is calculated in this manner using the corrected power consumption value of start-up accessory devices, because the corrected power consumption value of start-up accessory devices is higher than the minimum required power consumption for causing the fuel cell stack 12 to generate power, the maximum power output value of the fuel cell stack 12 can be set to a value higher than in the normal operation mode to thereby increase the amount of power generated by the fuel cell stack 12, thereby enabling an increase in the amount of heat generated by the fuel cell stack 12.

In the control section 18, in addition to the control for repeating the charging of the secondary battery 46 and the discharging from the secondary battery 46, it is possible to also perform control for supplying one or both of the generated power of the fuel cell stack 12 and the discharged power from the secondary battery 46 to the heater 50 (FIG. 1) and, by means of heat generation by the heater 50, enhancing warm-up of the fuel cell stack 12 and the secondary battery 46.

Second Embodiment of the Invention

Figure 8:
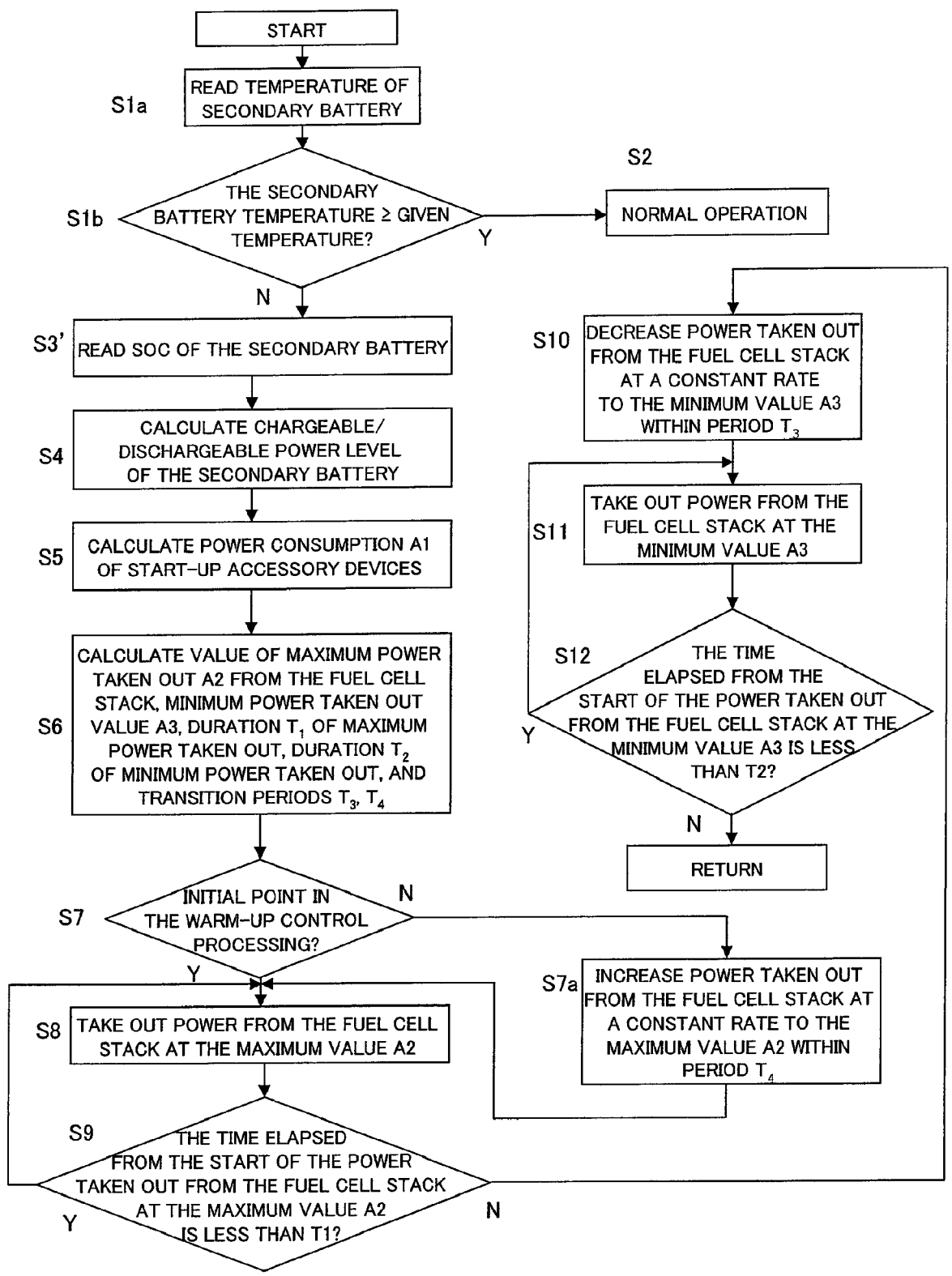
FIG. 8 is a flowchart showing a warm-up control processing performed in a fuel cell system according to a second embodiment of the present invention.

FIG. 8 is a flowchart that corresponds to FIG. 3, and shows warm-up control processing for warming up a secondary battery at the time of start-up of a fuel cell system according to a second embodiment of the present invention. In the case of the above-described first embodiment, in step S1 of FIG. 3, the control section 18 (FIGS. 1 and 2) judges whether or not the temperature of the fuel cell stack 12 (FIGS. 1 and 2) is equal to or higher than a given temperature, and, depending on the judged result, the processing proceeds to either a shift to normal operation in step S2 (FIG. 3) or to the warm-up control processing from step S3 (FIG. 3) through step S12 (FIG. 3). In contrast, according to the present embodiment, whether to shift to normal operation or to proceed with the warm-up control processing is selected depending on whether the detected temperature of the secondary battery 46 (FIGS. 1 and 2) is equal to or higher than a given temperature. This procedure is explained below in detail. In the following explanation, elements constituting the portions corresponding to the labeled elements in FIGS. 1 and 2 are denoted by the same reference numerals.

As shown in FIG. 8, in the present embodiment, at the start-up of the fuel cell system 10, in step S1a, the control section 18 reads a detection signal from the secondary battery sensor 48 every elapse of a given time interval, to thereby determine the temperature of the secondary battery 46. Subsequently, in step S1b, the control section 18 judges whether or not the temperature of the secondary battery 46 is equal to or higher than a given temperature arbitrarily determined in advance. In step S1a, in a case where sufficient time has elapsed from a stop of operation of the fuel cell system 10, the control section 18 may read, instead of the detection signal from the secondary battery sensor 48, a detection signal from an outside temperature sensor (not shown) to determine the outside temperature, and judge whether or not the outside temperature is equal to or higher than a predetermined given temperature.

When it is judged in step S1b of FIG. 8 that the temperature of the secondary battery 46 or the outside temperature is equal to or higher than a given temperature, warming up the secondary battery 46 is unnecessary. Accordingly, in that case, a shift is made to the normal operation mode in step S2, and the warm-up control processing is ended. On the other hand, when it is judged that the temperature of the secondary battery 46 or the outside temperature is lower than the given temperature, the processing proceeds to step S3'.

In step S3', the control section 18 reads a detection signal from the secondary battery sensor 48 to detect not only the temperature of the secondary battery 46 but also the SOC of the secondary battery 46. Subsequently, in step S4 through step S12 of FIG. 3, the warm-up control processing is executed similarly to that in the above-described first embodiment, and processing returns to step S1a.

In the present embodiment, as in the above-described first embodiment, the power generation calculation unit 52 gradually changes the calculated power generation value of the fuel cell stack 12 at the time of transition between the first processing and the second processing; i.e., at the time of transition in power taken out from the fuel cell stack 12 between the maximum power taken out level A2 and the minimum power taken out level A3 as shown in FIG. 4(a) noted above, the calculated power generation value being indicated in an output command. In other words, the magnitude of the calculated value is either gradually decreased at a constant rate or gradually increased at a constant rate. Accordingly, even at the time of reducing the rotational frequency of the air compressor 16 from a predetermined high value to a predetermined low value, which is during a transition between the first processing (for controlling the power distribution section 42 to supply generated power of the fuel cell stack 12 to the accessory devices and the secondary battery 46) and the second processing (for controlling the power distribution section 42 to supply generated power of the fuel cell stack 12 and discharged power of the secondary battery 46 to the accessory devices), a change in a target value of rotational frequency (i.e., drive state) of the air compressor 16 can be accurately followed by a change in the actual rotational frequency. Further, in turn, when the rotational frequency of the air compressor 16 is to be increased from a predetermined low value to a predetermined high value, a change in a target value of rotational frequency (i.e., drive state) of the air compressor 16 can similarly be accurately followed by a change in the actual rotational frequency. As a result, even at the time of discharging the secondary battery to a level close to the upper threshold of discharging level and at the time of charging the secondary battery to a level close to an upper threshold of charging level, possibilities of occurrence of over-discharge and overcharge of the secondary battery 46 can be reduced. In view that other configurations and achieved effects are similar to those of the first embodiment, explanations and drawings thereof will not be repeated.

Although the above embodiments are explained by reference to the case of performing warm-up control processing at the time of start-up of a fuel cell system 10, the present invention is not limited to such a case. For example, performance of the secondary battery 46 may become degraded when the fuel cell system 10 is under a low-temperature environment in situations other than the start-up, such as when the temperature of the fuel cell stack 12 or the secondary battery 46 becomes lower than a predetermined temperature during traveling or idling of a fuel cell vehicle incorporating the fuel cell system 10. The present invention may be applied to a configuration for executing warm-up control processing to warm up the secondary battery 46 in such instances. Further, it is also possible to apply the present invention to a configuration in which, when performing the second processing of the warm-up control processing, the fuel cell stack 12 is not caused to generate power, and only the power obtained by the discharging operation of the secondary battery 46 is supplied to at least one of the accessory devices and the load 44 (refer to FIGS. 1 and 2) in order to warm up the secondary battery 46.

INDUSTRIAL APPLICABILITY

The present invention is employed in a fuel cell system. For example, the present invention is employed in a fuel cell system that is used by being mounted on a fuel cell vehicle.

The invention claimed is:

1. A fuel cell system, comprising:
a fuel cell that generates electric power via an electrochemical reaction between a fuel gas and an oxidizing gas;
an oxidizing gas supply section for supplying the oxidizing gas to the fuel cell;
a secondary battery that performs charging and discharging of electric power;
an electric power distribution section that supplies electric power generated by the fuel cell to an accessory device required for power generation by the fuel cell and to the secondary battery for its charging, or supplies electric power discharged by the secondary battery to at least one of the accessory device and a load; and
a control section that performs warm-up control processing for warming up the secondary battery by alternately performing first processing and second processing, the first processing for controlling the electric power distribution section to supply generated power of the fuel cell to the accessory device and the secondary battery, and the second processing for controlling the electric power distribution section to supply at least discharged power from the secondary battery to at least one of the accessory device and the load;
wherein
the control section includes a power generation calculation unit that calculates, when performing the warm-up control processing, a chargeable/dischargeable power level of the secondary battery from a detected value of charge rate of the secondary battery; and calculates a power generation level of the fuel cell based on the calculated chargeable/dischargeable power level; and a drive control unit for the oxidizing gas supply section, that controls a drive state of the oxidizing gas supply section based on the calculated value of power generation level of the fuel cell indicated in an output command from the power generation calculation unit; and
the power generation calculation unit gradually changes a magnitude of the power generation level of the fuel cell at a time of transition between the first processing and the second processing, the power generation level being indicated in the output command input into the drive control unit for the oxidizing gas supply section.

2. The fuel cell system according to claim 1, wherein
the oxidizing gas supply section is an air compressor, and the drive control unit for the oxidizing gas supply section controls a rotational frequency of the air compressor based on the calculated value of power generation level of the fuel cell indicated in the output command from the power generation calculation unit.

3. The fuel cell system according to claim 1, wherein
at the time of transition between the first processing and the second processing, along with a decrease in the power generation level of the fuel cell indicated in the output command from the power generation calculation unit, the control section gradually reduces a charging level of the secondary battery and subsequently gradually increases a discharging level of the secondary battery, and, along with an increase in the power generation level of the fuel cell indicated in the output command from the power generation calculation unit, the control section gradually reduces the discharging level of the secondary battery and subsequently gradually increases the charging level of the secondary battery.

4. The fuel cell system according to claim 1, wherein
the control section selects whether to perform the warm-up control processing or to shift to a normal operation mode depending on presence or absence of a necessity to warm up the fuel cell and the secondary battery.

5. The fuel cell system according to claim 1, wherein
when performing the warm-up control processing, the power generation calculation unit calculates the chargeable/dischargeable power level of the secondary battery from detected values of temperature of the secondary battery and charge rate of the secondary battery, and calculates the power generation level of the fuel cell based on the calculated chargeable/dischargeable power level.

6. The fuel cell system according to claim 1, wherein
at the time of transition between the first processing and the second processing, depending on whether the power generation level of the fuel cell indicated in the output command from the power generation calculation unit is to be decreased or increased, the control section switches between an operation for shifting a state of the secondary battery from a charging state to a discharging state and an operation for shifting a state of the secondary battery from a discharging state to a charging state.

* * * * *